Dec. 20, 1949  J. P. WALL  2,492,077
ELECTRIC CIRCUIT AND A SAFETY SWITCH THEREFOR
Filed Oct. 18, 1947
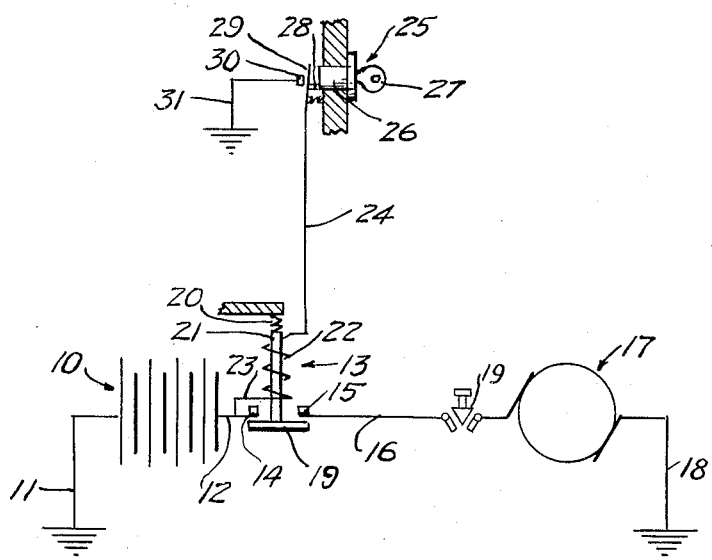
INVENTOR.
JOHN P. WALL
BY James M. Abbett
ATTY.

Patented Dec. 20, 1949

2,492,077

UNITED STATES PATENT OFFICE 2,492,077

ELECTRIC CIRCUIT AND A SAFETY SWITCH THEREFOR

John P. Wall, Los Angeles, Calif.

Application October 18, 1947, Serial No. 780,631

1 Claim. (Cl. 171—97)

This invention relates to electrical apparatus and particularly pertains to an electric circuit and a safety switch therefor.

In the operation of various pieces of equipment where electric energy is utilized it often occurs that pieces of electrical apparatus requiring electric energy for their operation are disposed at a remote point from the source of electric energy. This increases the hazard that a short circuit might be created at some point between the source of electric energy and an electric device to be connected therewith. In most instances an electric circuit is controlled by a switch disposed in relatively close proximity to the device to which the electric energy is fed and thus all of the electrical conduits between the switch and the source of electric energy are "live" and provide conditions whereby a short circuit might be created easily with disastrous results. An example of such a condition is in connection with the starting motor circuit of an internal combustion engine. In such circuits one live feed wire is provided to extend between one pole of the source of energy and one pole of the starting motor while the other pole of the source of electric energy and the other pole of the starting motor are connected to ground wires. It will thus be seen that at any point along the feed wire where the insulation might be broken a short circuit might be set up with the grounded parts of the structure, such for example, as the frame of an automobile. It is desirable therefore to interrupt the flow of electricity through the feed wire at a point directly associated with the source of electric energy and it is the principal object of the present invention to provide an electric circuit and a safety switch, which switch will act to completely break the feed conduit circuit at a point close to the source of electric energy by simple and effective means.

The present invention contemplates provision of the source of electric energy and a piece of apparatus to which said energy is supplied, said elements being included in an electric circuit interrupted by a manually controlled switch and an electrically controlled master switch whereby opening of the manually controlled switch will act automatically to permit the master switch to interrupt the circuit at a point in close proximity to the source of electric entrgy.

The invention is illustrated by way of example in the accompanying drawing in which the figure is a view in diagram showing the electric circuit and the pieces of electrical apparatus included therein.

Referring more particularly to the drawings, 10 indicates the source of electric energy and is here designated as a storage battery, although it is to be understood that any type of electrical generating means might be used in substitution thereof. When a storage battery is used it may be desirable to connect one pole to a ground wire 11, the opposite end of said wire being suitably grounded. The opposite pole of the battery 10 is provided with a feed wire 12. This wire leads to a master switch generally indicated at 13. The master switch is provided with a contact 14 with which the conductor 12 is connected electrically. A complementary contact 15 is provided. This contact is connected electrically with the conductor 16 which leads to one pole of an electrical piece of apparatus here diagrammatically indicated as the motor 17. The opposite pole of the motor 17 is here shown as provided with a ground wire 18 which makes a suitable ground connection. The contacts 14 and 15 of the master switch 13 may be electrically connected by a contact bar 19. This bar is normally disposed out of engagement with the contacts 14 and 15 either by gravity or by a spring 20 which acts against the end of a solenoid plunger 21, the opposite end of which plunger is connected to the contact bar 19. A solenoid coil 22 is disposed around the plunger 21 and at one end connects with the conductor 12 through a conductor 23. The opposite end of the solenoid coil 22 is provided with a conductor 24 which leads to a manually operated switch 25. The switch 25 is here shown as being of the locked type, including a lock barrel 26 to receive a key 27. An actuating member 28 on the barrel may be moved into engagement with the switch blade 29. The end of the conductor 24 is attached to the switch blade 29. When the member 28 engages the switch blade 29 it moves the blade 29 into electrical engagement with a contact 30. A ground wire 31 is attached to this contact at one end while its opposite end is suitably grounded.

In the operation of the present invention a manually operated switch 25 is normally open so that the switch blade 29 is out of contact with the conductor 30. At this time the contact bar 19 will be out of electrical engagement with the contacts 14 and 15, since the master switch 13 is biased to stand normally in an open position. When it is desired to close the electric circuit to the motor 17 a manually operated switch 25 is manipulated through the key and lock barrel 26 to move the element 28 so that it will force the switch blade 29 into electrical engagement with the contact 30. This will complete an electric circuit from the source of electric energy 10 through the feed wire 12 to the conduit 23 and thence through the solenoid winding 22 to conductor 24. Current will then flow through the switch blade 29 to contact 30 and thence through ground wire 31 to ground. The circuit will then be completed to the source of electric energy 10 from the ground wire 11. When this circuit is completed the solenoid coil 22 will be energized and will act upon the plunger 21 to draw the contact bar 19 into electrical engagement with the contacts 14 and 15. The feed circuit from the source of electrical energy will then be completed through the feed wire 12, contact 14, and then through contact bar 19 to contact 15. The flow of current will then continue through feed wire 16 to one pole of the piece of electrical apparatus 17 and then from the other pole of the piece of electrical apparatus 17 to the ground wire 18. It will be obvious that control switches in close proximity to the piece of electrical apparatus 17 may be interposed at a point in the length of either of the conductors 16 or 18. Preferably in accordance with common practice, a conventional starter switch 19 is interposed in the conductor 16.

From the foregoing it will be recognized that by manipulation of the manually controlled switch 25 the master switch may be instantly energized from the source of energy 10 to break or establish a feed circuit to the piece of apparatus 17 and to insure that the conductors 16 and 18 will not have any electrical connection with the source of electric energy 10 when the master switch is opened.

It will thus be seen that by the use of the electric circuit here shown and the safety switch structure that all of the electrical conduits in the apparatus will be out of circuit when the master switch is open to save for the relatively short lengths of feed wire 12 and ground wire 11, thus eliminating a major portion of potential fire hazard in the apparatus when electric energy is not required.

While I have shown the preferred form of my invention it is to be understood that various changes may be made in the combination, construction, and arrangement of parts of the apparatus by those skilled in the art without departing from the spirit of the invention as claimed.

Having thus described my invention, what I claim and desire to secure by Letters Patent is:

A starting system for automobiles including a storage battery, an electric starting motor located at a remote point from the storage battery, a solenoid master safety switch located directly adjoining the storage battery and comprising a contact bar, a pair of contacts adapted to be engaged by said contact bar, a solenoid plunger secured to said contact bar, yieldable means acting to normally maintain said contact bar out of engagement with said pair of contacts, a solenoid coil disposed around the plunger, a very short conductor wire leading from one pole of the storage battery to one contact of the master switch, a starter switch, a wire leading from the other contact of the master switch to one contact of the starter switch, a wire connecting the other contact of the starter switch with one pole of the motor, ground wires connected to the other pole of the storage battery and the other pole of the motor, a key-operated lock switch located at a point remote from the master switch, a wire leading from the first mentioned pole of the storage battery connected to one end of the solenoid coil, a wire leading from the other end of the solenoid coil to said key-operated switch, and a ground wire connected to said key-operated switch, whereby the closing of said key-operated switch will cause the solenoid to be energized and the master switch to be closed, thereby making the electrical energy from the battery available at the starter switch, and when the key-operated switch is opened the master switch is automatically opened and disconnects the battery from the starter switch.

JOHN P. WALL.

REFERENCES CITED

The following references are of record in the file of this patent:

UNITED STATES PATENTS

| Number | Name | Date |
| --- | --- | --- |
| 1,244,926 | Wallace | Oct. 30, 1917 |
| 1,935,509 | Leeah et al. | Nov. 14, 1933 |
| 1,995,946 | Schild | Mar. 26, 1935 |
| 2,044,917 | Richardson | June 23, 1936 |
| 2,073,645 | Maurer | Mar. 16, 1937 |
| 2,324,844 | Hutt | July 20, 1943 |
| 2,330,505 | Matthias | Sept. 28, 1943 |